(12) United States Patent
Eslambolchizadeh (10) Patent No.: US 7,570,765 B1
(45) Date of Patent: Aug. 4, 2009

(54) METHOD AND AN APPARATUS TO PERFORM SECURE REAL-TIME TRANSPORT PROTOCOL-ON-THE-FLY

(75) Inventor: Aria Eslambolchizadeh, San Jose, CA (US)

(73) Assignee: SonicWALL, Inc., Sunnyvale, CA (US)

( * ) Notice: Subject to any disclaimer, the term of this patent is extended or adjusted under 35 U.S.C. 154(b) by 1018 days.

(21) Appl. No.: 10/980,375

(22) Filed: Nov. 2, 2004

(51) Int. Cl.
*H04L 9/00* (2006.01)
(52) U.S. Cl. .................. 380/257; 380/278; 370/355; 370/356; 370/352; 370/252; 370/401
(58) Field of Classification Search .............. 380/257; 370/352, 355, 356
See application file for complete search history.

(56) References Cited

U.S. PATENT DOCUMENTS 7,308,101 B2 * 12/2007 Wing .................... 380/257

OTHER PUBLICATIONS

M. Bauger et al., "The Secure Real-time Transport Protocol (SRTP),", Cisco Systems, Network Working Group, Mar. 2004, 56 pages.

"Traversal of IP Voice and Video Data through Firewalls and NATs", RADVISION, A RADVISION Technology White Paper, 2001, 18 pages, Jul. 2001.
VoIP Basics, "A high level overview of Voice Over IP and its place in the New Zealand Market", 13 pages, Oct. 23, 2004, http://216.239.57.104/search?q=cache:ooXqz58tg14J:www.nznog.org/2004/crigby-voip-i....
VoIP Basics, "EMERGIC.ORG Rajesh Jain's Weblog on Emerging Technologies, Enterprises and Markets," Jun. 18, 2004, 3 pages, http://www.emergic.org/archives/indi/009137.php.

* cited by examiner

*Primary Examiner*—Simon Sing
*Assistant Examiner*—Simon King
(74) *Attorney, Agent, or Firm*—Blakely, Sokoloff, Taylor & Zafman, LLP (57) ABSTRACT

A method and an apparatus to perform Secure Real-time Transport Protocol-on-the-fly (SRTPoF) are disclosed. In one embodiment, the method includes monitoring negotiation between a first Voice-over-Internet-Protocol (VoIP) device and a second VoIP device after a call has been initiated between the first and the second VoIP devices, determining whether the first VoIP device is Secure Real-time Transport Protocol (SRTP)-capable and whether the second VoIP device is SRTP-capable, and performing SRTP-on-the-fly on a Real-time Transport Protocol (RTP) stream transmitted between the first and the second VoIP devices to make the call secure if the first VoIP device is not SRTP-capable and the second VoIP device is SRTP-capable. Other embodiments have been claimed and described.

28 Claims, 4 Drawing Sheets

METHOD AND AN APPARATUS TO PERFORM SECURE REAL-TIME TRANSPORT PROTOCOL-ON-THE-FLY

FIELD OF INVENTION

The present invention relates to Voice-over-Internet-Protocol (VoIP) communication, and more particularly, to performing secure real-time transport protocol-on-the-fly.

BACKGROUND

Voice-over-Internet-Protocol (VoIP) is a set of protocols for the encoding, transporting, and routing of audio calls over Internet Protocol (IP) networks. According to VoIP, voice data may be converted into digital data and sent in packets using IP instead of the traditional circuit transmissions of the Public Switch Telephone Network (PSTN). In some VoIP systems, the analog audio stream is converted into a digital format, and may be compressed and encapsulated in IP for transport over the Internet or other types of network (e.g., local area network (LAN), wide area network (WAN), etc.) according to Real-time Transport Protocol (RTP). The converted stream is hereinafter referred to as a RTP stream.

Currently, VoIP software is available to be installed into personal computers to allow users to make VoIP calls over the personal computers. In addition to VoIP software, dedicated VoIP hardware are also available, such as VoIP telephones (also known as IP phones), VoIP gateways, VoIP conferencing, VoIP voicemail, etc. However, the typical processing power of VoIP telephones is significantly less than that of the personal computers.

Although VoIP calls are typically less expensive than the traditional telephone calls using PSTN, one obstacle in the popularization of VoIP is the lack of security. Currently, security protocols, such as Secure Real-time Transport Protocol (SRTP), are developed to provide encryption of the RTP stream in VoIP calls. However, SRTP requires the VoIP endpoints (e.g., personal computers loaded with VoIP software, VoIP telephones, VoIP gateway, VoIP conferencing, etc.) to perform the encryption and this is not possible in many cases because many VoIP endpoints are VoIP telephones with insufficient processing power to perform encryption and/or decryption. In some cases, the VoIP software installed on personal computers may not support SRTP.

SUMMARY

The present invention includes a method and an apparatus to perform SRTP-on-the-fly. In one embodiment, the method includes monitoring and/or modifying negotiation between a first Voice-over-Internet-Protocol (VoIP) device and a second VoIP device during call setup between the first and the second VoIP devices, determining whether the first VoIP device is Secure Real-time Transport Protocol (SRTP)-capable and whether the second VoIP device is SRTP-capable, and performing SRTP-on-the-fly on a Real-time Transport Protocol (RTP) stream transmitted between the first and the second VoIP devices to make the call secure if the first VoIP device is not SRTP-capable and the second VoIP device is SRTP-capable.

In some embodiments, substantially the same technique may be applied to Real Time Control Protocol (RTCP) as well as Real-time Transfer Protocol (RTP). When the security applies to RTP or RTCP, they change to Secure Real-time Transfer Protocol (SRTP) and Secure Real Time Control Protocol (SRTCP), respectively.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus to perform SRTP-on-the-fly are described. In the following description, numerous specific details are set forth. However, it is understood that embodiments of the invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
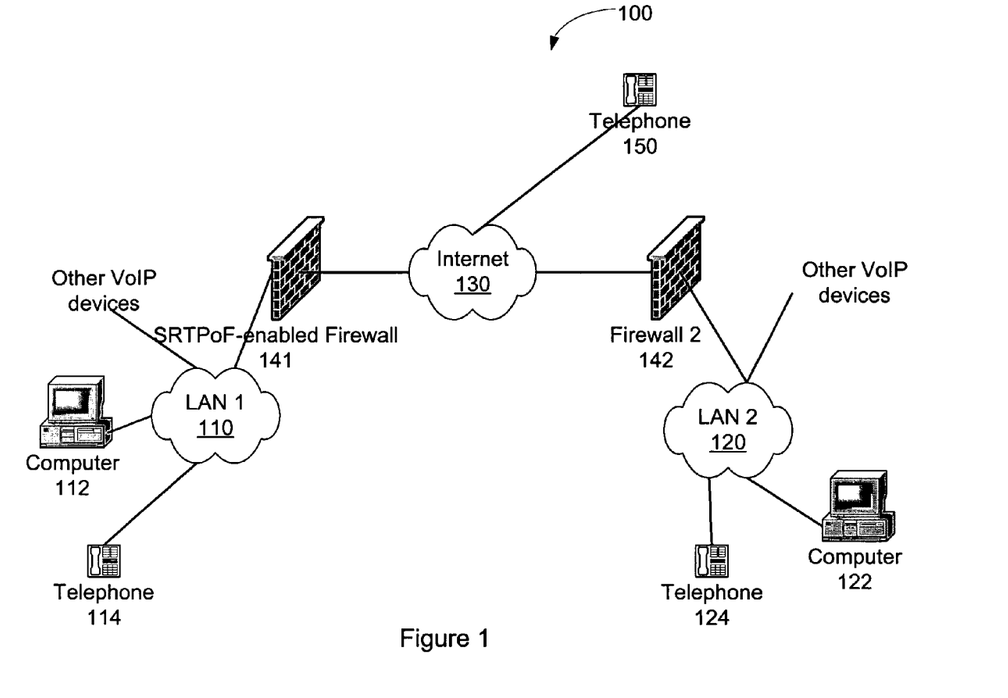
FIG. 1 illustrates a system usable with one embodiment of the invention.

FIG. 1 illustrates one embodiment of a system usable with the invention. The system 100 includes a first local area network (LAN) 110, an Internet 130, a first firewall 141 coupled between the first LAN 110 and the Internet 130, and a number of VoIP devices coupled to the first LAN 110. Examples of the VoIP devices include a personal computer 112 with VoIP software installed, a VoIP telephone 114, etc. The Internet 130 is further coupled to other VoIP devices directly or indirectly. For example, another VoIP telephone 150 may be coupled to the Internet 130. In one embodiment, a second LAN 120 is coupled to the Internet 130 via a second firewall 142, where the second LAN 120 is further coupled to other VoIP devices, such as a second personal computer 122, a second VoIP telephone 124, etc.

Note that any or all of the components and the associated hardware illustrated in FIG. 1 may be used in various embodiments of the system 100. However, it should be appreciated that other configurations of the system 100 may include more or less devices than those shown in FIG. 1.

In one embodiment, the first firewall 141 is capable of performing SRTP-on-the-fly (SRTPoF) to allow one of the VoIP devices coupled to the first LAN 110 to have a secure VoIP call over the Internet 130 with another VoIP device (e.g., the VoIP telephone 150, the VoIP telephone 120 via the firewall 142, etc.). Details of some embodiments of the process to perform SRTPoF are described below with reference to FIGS. 3 and 4. Before discussing the process to perform SRTPoF, one embodiment of the first firewall 141 is discussed in details now.

Figure 2:
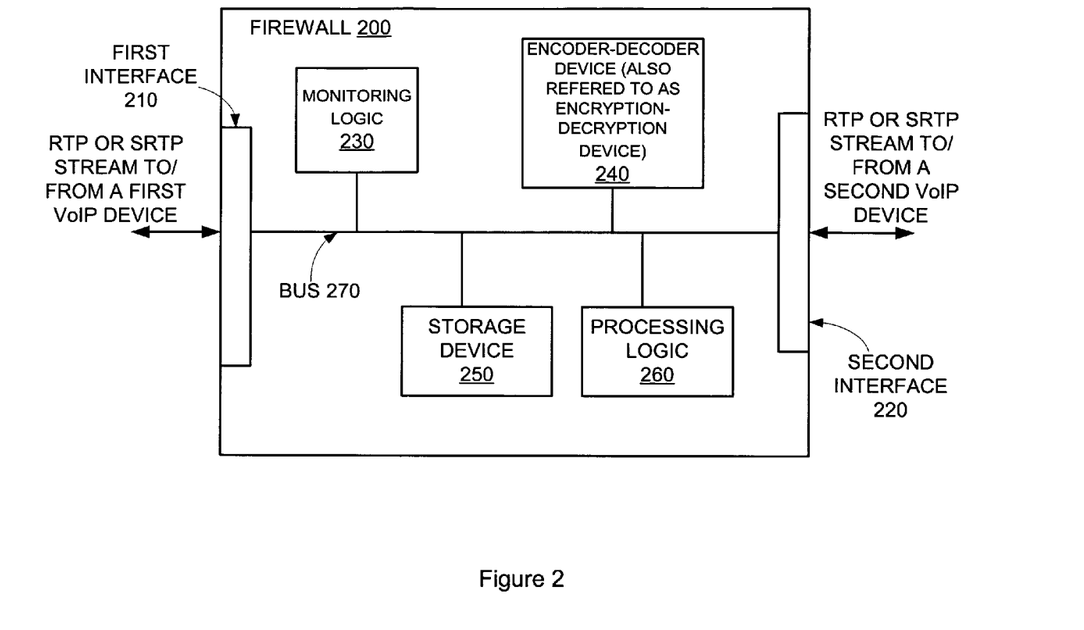
FIG. 2 illustrates one embodiment of a firewall.

FIG. 2 shows one embodiment of a firewall capable of performing SRTPoF. The firewall 200 includes a first interface 210, a second interface 220, monitoring logic 230, an encoder-decoder device 240, a storage device 250, processing logic 260, and a bus 270. The first interface 210, the second interface 220, the monitoring logic 230, the encoder-decoder device 240 (also referred to as encryption-decryption device), the storage device 250, and the processing logic 260 are coupled to each other via the bus 270.

In one embodiment, the firewall 200 is directly or indirectly coupled to a first and a second VoIP devices via the first and the second interfaces 210 and 220, respectively. For example, the first interface 210 may be directly coupled to a VoIP device (such as a VoIP telephone, a VoIP-capable personal computer) or indirectly coupled to a VoIP device via a local area network (e.g., the first LAN 110 in FIG. 1). Likewise, the second interface 220 may be directly coupled to a VoIP device (such as a VoIP telephone, a VoIP-capable personal computer) or indirectly coupled to a VoIP device via an Internet and/or another firewall (e.g., the second firewall 142 in FIG. 1). When a VoIP call is established between the first and the second VoIP devices, a RTP stream containing voice and/or video data may pass through the firewall 200 via the first and the second interfaces 210 and 220.

In one embodiment, the storage device 250 stores routing and/or transformation data, which may include various information, such as the Internet Protocol (IP) address and/or port number of each of the first and the second VoIP devices, etc. The routing information may be stored in a VoIP transformation table. To establish a VoIP call between the first and the second VoIP devices, the first and the second VoIP devices negotiate with each other by exchanging signaling messages through the firewall 200. The monitoring logic 230 in the firewall 200 monitors the negotiation. In some embodiments, the monitoring logic 230 identifies one or more predetermined parameters in the signaling messages exchanged, where the predetermined parameters are relevant to whether the first and the second VoIP devices are SRTP-capable. Using the routing data and the identified parameters, the processing logic 260 may determine whether each of the first and the second VoIP devices is SRTP-capable.

The firewall 200 further includes an encoder-decoder device 240 (also referred to as encryption-decryption device) to perform SRTPoF on a RTP stream transmitted between the first and the second VoIP devices during the call established under certain predetermined circumstances. Details of these predetermined circumstances and SRTPoF are described below with reference to FIGS. 3 and 4.

Figure 3:
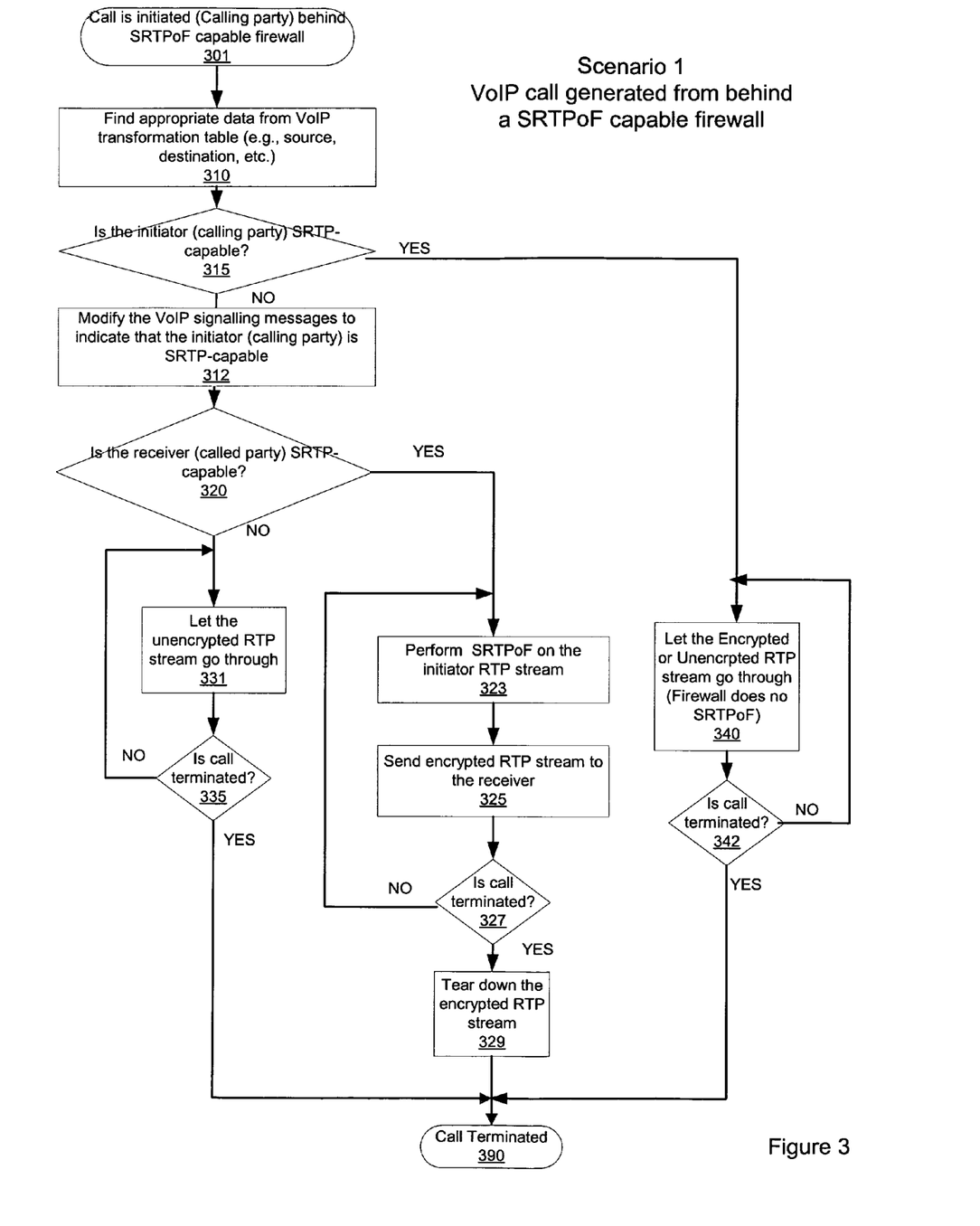
FIG. 3 illustrates a flow diagram of one embodiment of a process to perform SRTP-on-the-fly when a call is being initiated behind a SRTPoF-capable firewall.

FIG. 3 shows a flow diagram of one embodiment of a process to perform SRTP-on-the-fly in a VoIP call generated from behind a SRTP-on-the-fly capable firewall (such as the firewall 200 in FIG. 2 and the firewall 141 in FIG. 1). The process is performed by processing logic that may comprise hardware (e.g., circuitry, dedicated logic, etc.), software (such as is run on a general-purpose computer system, a server, or a dedicated machine), or a combination of both. The VoIP device initiating the call is referred to as the calling party or the initiator, while the VoIP device receiving the call is referred to as the called party or the receiver in the following discussion. Examples of the receiver may include a VoIP device (e.g., VoIP telephone) and a firewall coupled to a VoIP device, where the firewall may or may not be SRTPoF-capable.

Referring to FIG. 3, the process begins when a VoIP call is initiated by the calling party behind a SRTPoF-capable firewall (processing block 301). Processing logic finds the appropriate routing data from a VoIP transformation table stored in the SRTPoF-capable firewall (processing block 310). The routing data may include the source IP address and/or port number, the destination IP address and/or port number for the VoIP devices, etc. Then processing logic checks to determine whether the initiator is SRTP-capable (processing block 315). In some embodiments, processing logic uses one or more parameters identified in the messages exchanged between the initiator and the receiver during their negotiation and the routing data to determine whether the initiator is SRTP-capable.

If the initiator is SRTP-capable, the initiator may encrypt the RTP stream, depending on whether the receiver is SRTP-capable, and processing logic does not have to perform SRTPoF. Thus, processing logic allows the encrypted or unencrypted RTP stream to pass through the firewall (processing block 340). In other words, the firewall does not perform SRTPoF in this situation. After passing the RTP stream, processing logic checks whether the call is terminated (processing block 342). If the call is not terminated, processing logic returns to processing block 340 to let additional RTP stream to pass through the firewall. Otherwise, processing logic transitions to processing block 390 and the process ends with the call being terminated.

If the initiator is not SRTP-capable, processing logic adds SRTP capability by modifying the signaling message (processing block 312) before sending the signaling message out. Processing logic checks whether the receiver is SRTP-capable (processing block 320). In some embodiments, processing logic uses one or more parameters identified in the signaling messages exchanged between the initiator and the receiver during their negotiation as well as the routing data to determine whether the receiver is SRTP-capable. The technique to determine the SRTP capabilities varies among different VoIP protocols, such as Session Initiation Protocol (SIP), H.323, Media Gateway Control Protocol (MGCP), H.248 Megaco, etc. For instance, in H.323 protocol, SRTP capability may be determined using the existing terminal capabilities exchange that uses h235SecurityCapability entries in the capabilityTable of the H.245 TerminalCapabilitySet message. The encryptionAuthenticationAndIntegrity field in the h235SecurityCapability entry contains the SrtpCryptoCapability field which will specify the SRTP cryptosuites. Alternatively, in SIP, the Session Description Protocol (SDP) parameters are used to determine the SRTP capability for either the initiator or the receiver. Below is an example of a SDP message indicating the lack of SRTP capability.

v=0 o=romulan 2890844526 2890842807 IN IP4 10.1.1.20 s=SDP Seminar i=A discussion on the session description protocol u=http://www.sonicall.com/sdp.03.ps e=ariae@sonicwall.com (Aria E.)

c=IN IP4 224.2.17.12/127 t=2873397496 2873404696 a=recvonly m=audio 49170 RTP/AVP 0→This indicates that there is no SRTP capability m=video 51372 RTP/AVP 31→This indicates that there is no SRTP capability m=application 32416 udp wb a=orient:portrait If the receiver is also not SRTP-capable, then a secure VoIP call cannot be established between the initiator and the receiver because the receiver cannot decrypt an encrypted RTP stream. Thus, processing logic allows the unencrypted RTP stream from the initiator to pass through the firewall (processing block 331). Processing logic then checks whether the call is terminated (processing block 335). If the call is not terminated, processing logic returns to processing block 331 to let additional RTP stream to pass through the firewall. Otherwise, processing logic transitions to processing block 390 and the process ends with the call being terminated.

However, if the receiver is SRTP-capable, processing logic performs SRTPoF to allow a secure VoIP call between the initiator and the receiver, albeit the initiator behind the firewall is not SRTP-capable. In one embodiment, processing logic modifies the VoIP signaling messages exchanged between the initiator and the receiver to indicate that the initiator is SRTP-capable (processing block 312). For instance, processing logic may set or reset a parameter indicative of the SRTP-capability of the initiator in one or more of the signaling messages in order to represent to the receiver that the initiator is SRTP-capable. Below is an example of SDP parameters in SIP that have been set by the firewall to indicate SRTP capability.

v=0 o=Dena 2890844526 2890842807 IN IP4 10.47.16.5 s=SRTP Discussion i=A discussion of Secure RTP u=http://www.sonicwall.com/srtp.pdf e=ariae@sonicwall.com (Aria E.)

c=IN IP4 10.2.17.12 t=2873397496 2873404696 m=audio 49170 RTP/SAVP 0→This indicates that there is SRTP capability a=crypto:1 AES_CM_128_HMAC_SHA1_80 inline:WVNfX19zZW1jdGwgKCkgewkyMjA7fQp9Cn VubGVz|2^20|1:4 FEC_ORDER=FEC_SRTP

Then the receiver may be tricked into accepting a secure VoIP call with the initiator.

Once the secure VoIP call is established between the initiator and the receiver, processing logic performs SRTPoF on the RTP stream transmitted from the initiator to the receiver (processing block 323). In one embodiment, processing logic may encrypt or encode the RTP stream from the initiator and then send the encrypted RTP stream to the receiver because the initiator cannot encrypt the RTP stream. Then processing logic sends the RTP stream to either the initiator or the receiver (processing block 325). In some embodiments, the encryption is SRTP-compliant, which is also referred to as RFC 3711 compliant.

Processing logic then checks whether the VoIP call is terminated (processing block 327). If the call is not terminated, processing logic returns to processing block 323 to perform SRTPoF on additional RTP stream. Otherwise, processing logic tears down the encrypted RTP stream in response to the termination of the VoIP call (processing block 329). Finally, the process ends at processing block 390 with the VoIP call being terminated.

Figure 4:
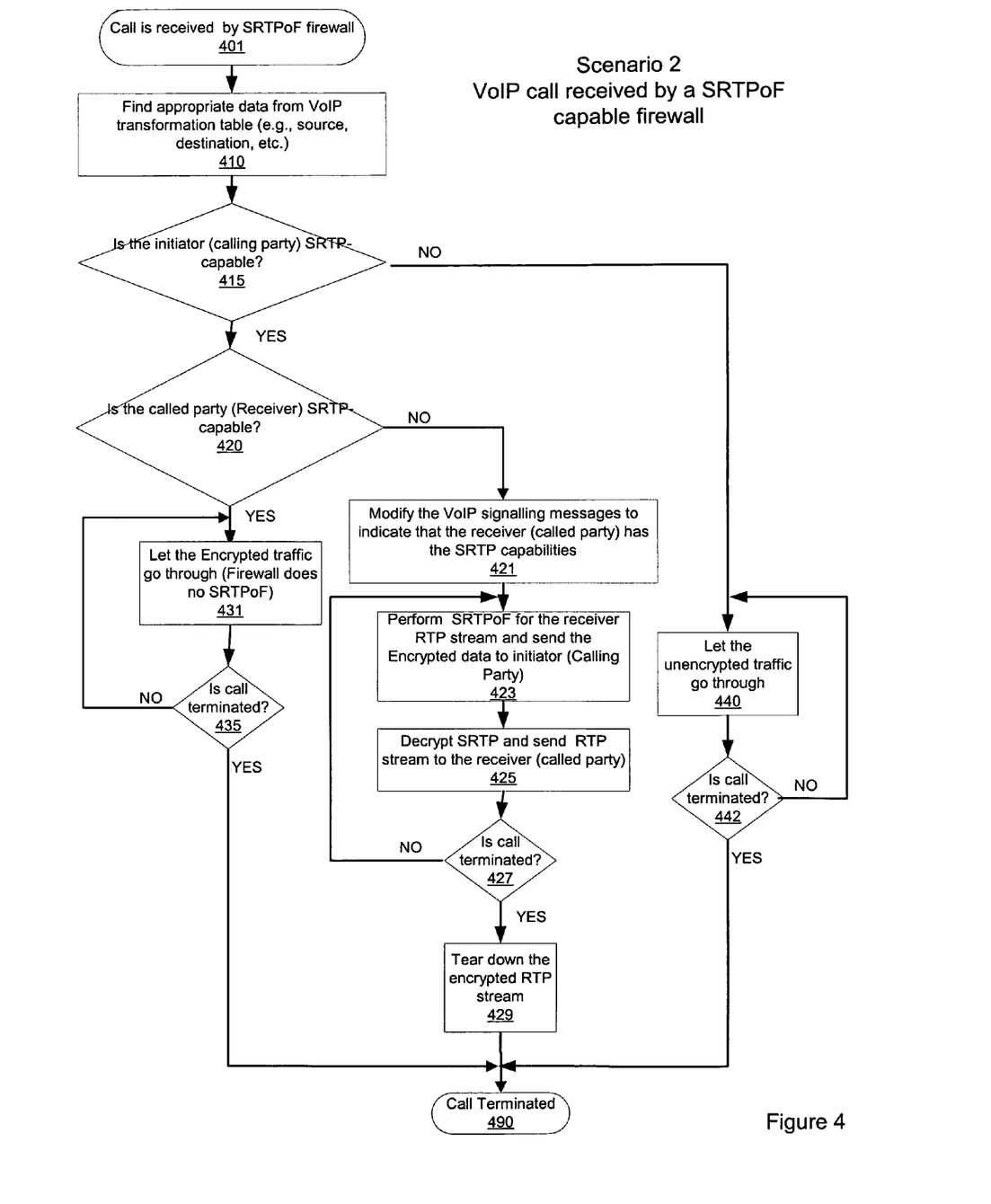
FIG. 4 illustrates a flow diagram of one embodiment of a process to perform SRTP-on-the-fly when a call is being received by a SRTPoF-capable firewall.

FIG. 4 shows a flow diagram of one embodiment of a process to perform SRTPoF in a VoIP call received by a SRTPoF capable firewall (such as the firewall 200 in FIG. 2 and the firewall 141 in FIG. 1). The process is performed by processing logic that may comprise hardware (e.g., circuitry, dedicated logic, etc.), software (such as is run on a general-purpose computer system, a server, or a dedicated machine), or a combination of both. The VoIP device initiating the call is referred to as the calling party or the initiator, while the VoIP device receiving the call is referred to as the called party or the receiver in the following discussion.

Referring to FIG. 4, the process begins when a VoIP call is received from the calling party by the SRTPoF-capable firewall at processing block 401. Processing logic finds the appropriate routing data from a VoIP transformation table stored in the SRTPoF-capable firewall (processing block 410). The routing data may include an IP address and/or port number of the source, an IP address and/or port number of the destination, etc. Processing logic then checks if the initiator is SRTP-capable (processing block 415). In one embodiment, processing logic monitors signaling messages between the initiator and the receiver to identify parameters relevant to the SRTP capability of the initiator. Using these parameters and the appropriate routing data from the VoIP transformation table, processing logic may determine whether the initiator is SRTP-capable. For example, in SIP protocol, the SDP specific parameters are used to indicate SRTP capabilities, the following SDP message indicates the lack of SRTP capability.

capability: v=0 o=romulan 2890844526 2890842807 IN IP4 10.1.1.20 s=SDP Seminar i=A discussion on the session description protocol u=http://www.sonicwall.com/sdp.03.ps e=ariae@sonicwall.com (Aria E.)

c=IN IP4 224.2.17.12/127 t=28733974962873404696 a=recvonly m=audio 49170 RTP/AVP 0→This indicates that there is no SRTP capability m=video 51372 RTP/AVP 31→This indicates that there is no SRTP capability m=application 32416 udp wb a=orient:portrait If the initiator is not SRTP-capable, then the RTP stream from the initiator is not touched. Therefore, the firewall may allow the RTP stream to pass through to the receiver (processing block 440). Processing logic checks whether the VoIP call is terminated (processing block 442). If the call is not terminated, processing logic returns to processing block 440 to let additional RTP stream from the initiator to pass through the firewall. Otherwise, processing logic transitions to processing block 490 and the process ends with the call being terminated.

If the initiator is SRTP-capable, then the RTP stream sent from the initiator may be decrypted or decoded. In some embodiments, the encrypted RTP stream is a SRTP stream. Processing logic checks if the receiver is SRTP-capable (processing block 420). In one embodiment, processing logic checks the VoIP signaling messages between the initiator and the receiver. Based on one or more parameters identified in the signaling messages and the appropriate routing data from the VoIP transformation table, processing logic may determine whether the receiver is SRTP-capable. Below is an example of SDP parameters that indicate SRTP capability.

capabilities: v=0 o=Dena 2890844526 2890842807 IN IP4 10.33.16.5 s=SRTP Discussion i=A discussion of Secure RTP u=http://www.sonicwall.com/srtp.pdf e=ariae@sonicwall.com (Aria E.)

c=IN IP4 10.2.17.12 t=2873397496 2873404696 m=audio 49170 RTP/SAVP 0→This indicates that there is SRTP capability a=crypto:1 AES_CM_128_HMAC_SHA1_80 inline:WVNfX19zZW1jdGwgKCkgewkyMjA7fQp9Cn VubGVz|2^20|1:4 FEC_ORDER=FEC_SRTP

If the receiver is SRTP-capable, then the receiver is able to decrypt or decode the encrypted RTP stream from the initiator. Thus, processing logic allows the encrypted RTP stream to pass through the firewall to the receiver without performing SRTPoF on the encrypted RTP stream (processing block 431). Processing logic checks whether the VoIP call is terminated (processing block 435). If the call is not terminated, processing logic returns to processing block 431 to let additional encrypted RTP stream from the initiator to pass through the firewall to the receiver. Otherwise, processing logic transitions to processing block 490 and the process ends with the call being terminated.

However, if the receiver is not SRTP-capable, then the receiver is unable to decrypt or decode the encrypted RTP stream from the initiator. In order to allow the VoIP call to be secure, processing logic first modifies the VoIP signaling messages to indicate to the initiator that the receiver is SRTP-capable (processing block 421). Processing logic may set or reset one or more parameters indicative of the SRTP-capability of the receiver in the signaling messages to trick the initiator to send encrypted RTP stream to the firewall. Below is an example for SIP protocol, where SDP parameters that are added and/or modified to indicate SRTP capability:

v=0 o=Dena 2890844526 2890842807 IN IP4 10.47.16.5 s=SRTP Discussion i=A discussion of Secure RTP u=http://www.sonicwall.com/srtp.pdf e=ariae@sonicwall.com (Aria E.)

c=IN IP4 10.2.17.12 t=28733974962873404696 m=audio 49170 RTP/SAVP 0→This line has been modified to indicate that there is SRTP capability a=crypto:1 AES_CM_128_HMAC_SHA1_80 inline:WVNfX19zZW1jdGwgKCkgewkyMjA7fQp9Cn VubGVz|2^20|1:4 FEC_ORDER=FEC_SRTP

Then processing logic performs SRTPoF on the RTP stream from the receiver (processing block 423). In some embodiments, processing logic decrypts or decodes the encrypted RTP stream from the initiator. Then processing logic sends the decrypted RTP stream to the receiver (processing block 425).

Processing logic checks whether the VoIP call is terminated (processing block 427). If the call is not terminated, processing logic returns to processing block 423 to perform SRTPoF for the receiver stream and send the encrypted data to the initiator (i.e., the calling party). Otherwise, processing logic tears down the encrypted RTP stream in response to the termination of the VoIP call (processing block 429). Then processing logic transitions to processing block 490 and the process ends with the call being terminated.

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations described herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, the present invention is not described with reference to any particular programming language. It will be appreciated that a variety of programming languages may be used to implement the teachings of the invention as described herein.

A machine-accessible medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
    monitoring negotiation between a first Voice-over-Internet-Protocol (VoIP) device and a second VoIP device during setup of a call between the first and the second VoIP devices;
    determining whether the first VoIP device is Secure Real-time Transport Protocol (SRTP)-capable and whether the second VoIP device is SRTP-capable; and
    performing SRTP-on-the-fly on a Real-time Transport Protocol (RTP) stream transmitted between the first and the second VoIP devices to make the call secure if the first VoIP device is not SRTP-capable and the second VoIP device is SRTP-capable, wherein performing SRTP-on-the-fly on the RTP stream comprises
        encrypting the RTP stream using a firewall on the side of the first VoIP device as the RTP stream passes through the firewall if the first VoIP device sends the RTP stream to the second VoIP device, and
        sending the encrypted RTP stream from the firewall to the second VoIP device.

2. The method of claim 1, further comprising:
    finding routing data from a VoIP transformation table, the routing data including at least one of an Internet Protocol (IP) address and a port number of each of the first and the second VoIP devices; and
    using the routing data found and content of the negotiation to determine whether the first VoIP device is SRTP-capable and whether the second VoIP device is SRTP-capable.

3. The method of claim 1, further comprises:
    the firewall modifying one or more parameters in a message transmitted between the first and the second VoIP devices during the negotiation to indicate to the second VoIP device that the first VoIP device is SRTP-capable if the first VoIP device is not SRTP-capable and the second VoIP device is SRTP-capable.

4. The method of claim 3, further comprising:
    the firewall tearing down the encrypted RTP stream when the call is terminated.

5. The method of claim 4, wherein the second VoIP device comprises a SRTP-capable firewall.

6. The method of claim 4, wherein the second VoIP device comprises a SRTP-capable Internet Protocol (IP) phone.

7. The method of claim 1, wherein performing SRTP-on-the-fly on the RTP stream comprises:
    decrypting the RTP stream using a firewall on the side of the first VoIP device as the RTP stream passes through the firewall if the second VoIP device sends the RTP stream to the first VoIP device; and
    sending the decrypted RTP stream from the firewall to the first VoIP device.

8. The method of claim 1, wherein the RTP stream comprises at least one of voice and video data.

9. A machine-accessible medium that provides instructions that, if executed by a processor, will cause the processor to perform operations comprising:
    monitoring negotiation between a first Voice-over-Internet-Protocol (VoIP) device and a second VoIP device during setup of a call between the first and the second VoIP devices;
    determining whether the first VoIP device is Secure Real-time Transport Protocol (SRTP)-capable and whether the second VoIP device is SRTP-capable; and
    performing SRTP-on-the-fly on a Real-time Transport Protocol (RTP) stream transmitted between the first and the second VoIP devices to make the call secure if the first VoIP device is not SRTP-capable and the second VoIP device is SRTP-capable, wherein performing SRTP-on-the-fly on the RTP stream comprises
        encrypting the RTP stream using a firewall on the side of the first VoIP device as the RTP stream passes through the firewall if the first VoIP device sends the RTP stream to the second VoIP device, and
        sending the encrypted RTP stream from the firewall to the second VoIP device.

10. The machine-accessible medium of claim 9, wherein the operations further comprise:
    finding routing data from a VoIP transformation table, the routing data including at least one of an Internet Port (IP) address and a port number of each of the first and the second VoIP devices; and
    using the routing data found and content of the negotiation to determine whether the first VoIP device is SRTP-capable and whether the second VoIP device is SRTP-capable.

11. The machine-accessible medium of claim 9, wherein the operations further comprise:
    the firewall modifying one or more parameters in a message transmitted between the first and the second VoIP devices during the negotiation to indicate to the second VoIP device that the first VoIP device is SRTP-capable if the first VoIP device is not SRTP-capable and the second VoIP device is SRTP-capable.

12. The machine-accessible medium of claim 11, wherein the operations further comprise:
    the firewall tearing down the encrypted RTP stream when the call is terminated.

13. The machine-accessible medium of claim 12, wherein the second VoIP device comprises a SRTP-capable firewall.

14. The machine-accessible medium of claim 12, wherein the second VoIP device comprises a SRTP-capable Internet Protocol (IP) phone.

15. The machine-accessible medium of claim 9, wherein performing SRTP-on-the-fly on the RTP stream comprises:
    decrypting the RTP stream using a firewall on the side of the first VoIP device as the RTP stream passes through the firewall if the second VoIP device sends the RTP stream to the first VoIP device; and
    sending the decrypted RTP stream from the firewall to the first VoIP device.

16. The machine-accessible medium of claim 9, wherein the RTP stream comprises at least one of voice and video data.

17. An apparatus comprising:
    a first interface to be coupled to a first Voice-over-Internet-Protocol (VoIP) device;

a second interface to be coupled to a second VoIP device via an internet;
a monitor to monitor negotiation between the first and the second VoIP devices during setup of a call between the first and the second VoIP devices; and
an encoder-decoder to perform Secure Real-time Transport Protocol (SRTP)-on-the-fly on a Real-time Transport Protocol (RTP) stream transmitted between the first and the second VoIP devices to make the call secure if the first VoIP device is not SRTP-capable and the second VoIP device is SRTP-capable, wherein the encoder-decoder comprises an encoder to encrypt the RTP stream on the side of the first VoIP device as the RTP stream arrives from the first VoIP device if the first VoIP device sends the RTP stream to the second VoIP device.

18. The apparatus of claim 17, further comprising:
a storage device to store routing data, the routing data including at least one of an Internet Port (IP) address and a port number of each of the first and the second VoIP devices; and
processing logic to use the routing data and content of the negotiation to determine whether the first VoIP device is SRTP-capable and whether the second VoIP device is SRTP-capable.

19. The apparatus of claim 17, wherein the encoder-decoder comprises a decoder to decrypt the RTP stream on the side of the first VoIP device as the RTP stream arrives from the second VoIP device if the second VoIP device sends the RTP stream to the first VoIP device.

20. The apparatus of claim 17, wherein the RTP stream comprises at least one of voice and video data.

21. A system comprising:
a first Voice-over-Internet-Protocol (VoIP) device;
a local area network (LAN) coupled to the first VoIP device; and
a firewall coupled to the first VoIP device via the LAN, the firewall comprising:
  a first interface coupled to the LAN;
  a second interface coupled to a second VoIP device via an internet;
  a monitor to monitor negotiation between the first and the second VoIP devices during setup of a call between the first and the second VoIP devices; and
  an encoder-decoder to perform Secure Real-time Transport Protocol (SRTP)-on-the-fly on a Real-time Transport Protocol (RTP) stream transmitted between the first and the second VoIP devices to make the call secure if the first VoIP device is not SRTP-capable and the second VoIP device is SRTP-capable, wherein the encoder-decoder comprises an encoder to encrypt the RTP stream on the side of the first VoIP device as the RTP stream arrives from the first VoIP device if the first VoIP device sends the RTP stream to the second VoIP device.

22. The system of claim 21, wherein the firewall further comprises:
a storage device to store routing data, the routing data including at least one of an Internet Port (IP) address and a port number of each of the first and the second VoIP devices; and
processing logic to use the routing data and content of the negotiation to determine whether the first VoIP device is SRTP-capable and whether the second VoIP device is SRTP-capable.

23. The system of claim 21, wherein the encoder-decoder comprises a decoder to decrypt the RTP stream on the side of the first VoIP device as the RTP stream arrives from the second VoIP device if the second VoIP device sends the RTP stream to the first VoIP device.

24. The system of claim 21, wherein the RTP stream comprises at least one of voice and video data.

25. A method comprising:
modifying one or more parameters in a message transmitted between a first and a second Voice-over-Internet-Protocol (VoIP) devices during negotiation of a VoIP call to establish a Real-time Transport Protocol (RTP) stream from the first VoIP device and a Secure RTP (SRTP) stream toward the second VoIP device;
encrypting packets of the VoIP call sent by the first VoIP device to the second VoIP device;
decrypting packets of the VoIP call sent by the second VoIP device to the first VoIP device; and
determining SRTP capability of the first VoIP device and SRTP capability of the second VoIP device, wherein modifying the one or more parameters in the message comprises modifying the one or more parameters in the message in response to the SRTP capability of the first VoIP device and the SRTP capability of the second VoIP device.

26. The method of claim 25, further comprising:
finding routing data from a VoIP transformation table, the routing data including at least one of an Internet Port (IP) address and a port number of each of the first and the second VoIP devices, wherein determining the SRTP capability of the first VoIP device and SRTP capability of the second VoIP device comprises using the routing data found and content of the negotiation to determine the SRTP capability of the first VoIP device and the SRTP capability of the second VoIP device.

27. A machine-accessible medium that provides instructions that, if executed by a processor, will cause the processor to perform operations comprising:
modifying one or more parameters in a message transmitted between a first and a second Voice-over-Internet-Protocol (VoIP) devices during negotiation of a VoIP call to establish a Real-time Transport Protocol (RTP) stream from the first VoIP device and a Secure RTP (SRTP) stream toward the second VoIP device;
encrypting packets of the VoIP call sent by the first VoIP device to the second VoIP device;
decrypting packets of the VoIP call sent by the second VoIP device to the first VoIP device; and
determining SRTP capability of the first VoIP device and SRTP capability of the second VoIP device, wherein modifying the one or more parameters in the message comprises modifying the one or more parameters in the message in response to the SRTP capability of the first VoIP device and the SRTP capability of the second VoIP device.

28. The machine-accessible medium of claim 27, wherein the operations further comprise:
finding routing data from a VoIP transformation table, the routing data including at least one of an Internet Port (IP) address and a port number of each of the first and the second VoIP devices, wherein determining the SRTP capability of the first VoIP device and SRTP capability of the second VoIP device comprises using the routing data found and content of the negotiation to determine the SRTP capability of the first VoIP device and the SRTP capability of the second VoIP device.

* * * * *